May 23, 1933.  L. SCHWARTZBERG  1,910,408
CELL STRUCTURE AND INCLOSING ELEMENT
Filed July 3, 1930  4 Sheets-Sheet 1
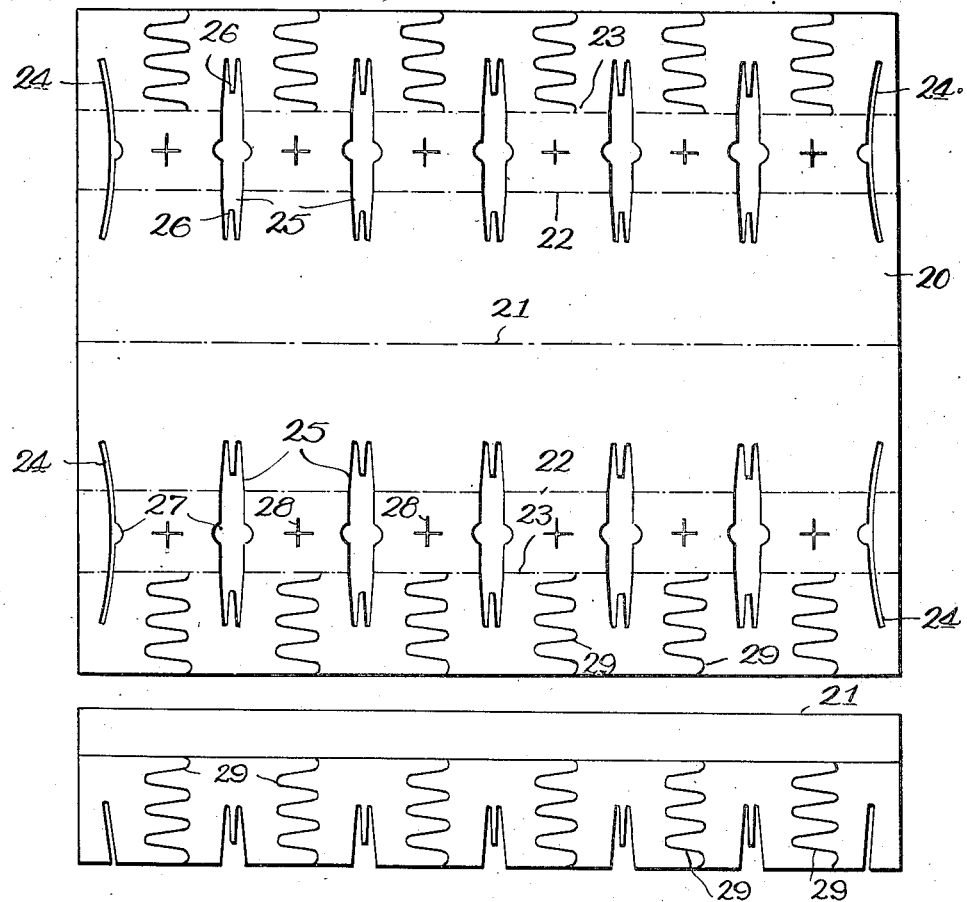
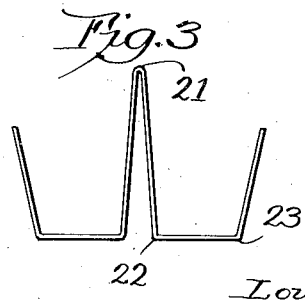

May 23, 1933.  L. SCHWARTZBERG  1,910,408
CELL STRUCTURE AND INCLOSING ELEMENT
Filed July 3, 1930  4 Sheets-Sheet 2

May 23, 1933. L. SCHWARTZBERG 1,910,408
CELL STRUCTURE AND INCLOSING ELEMENT
Filed July 3, 1930 4 Sheets-Sheet 3
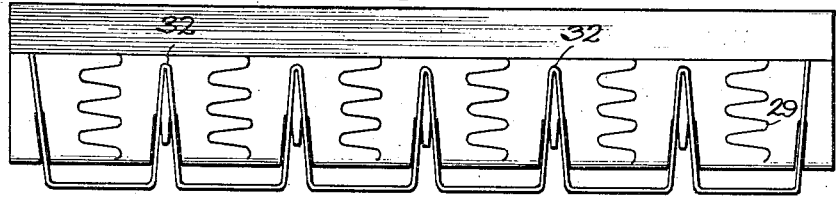
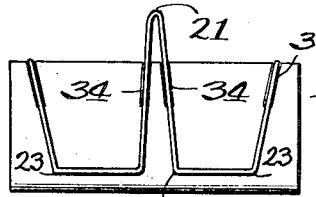
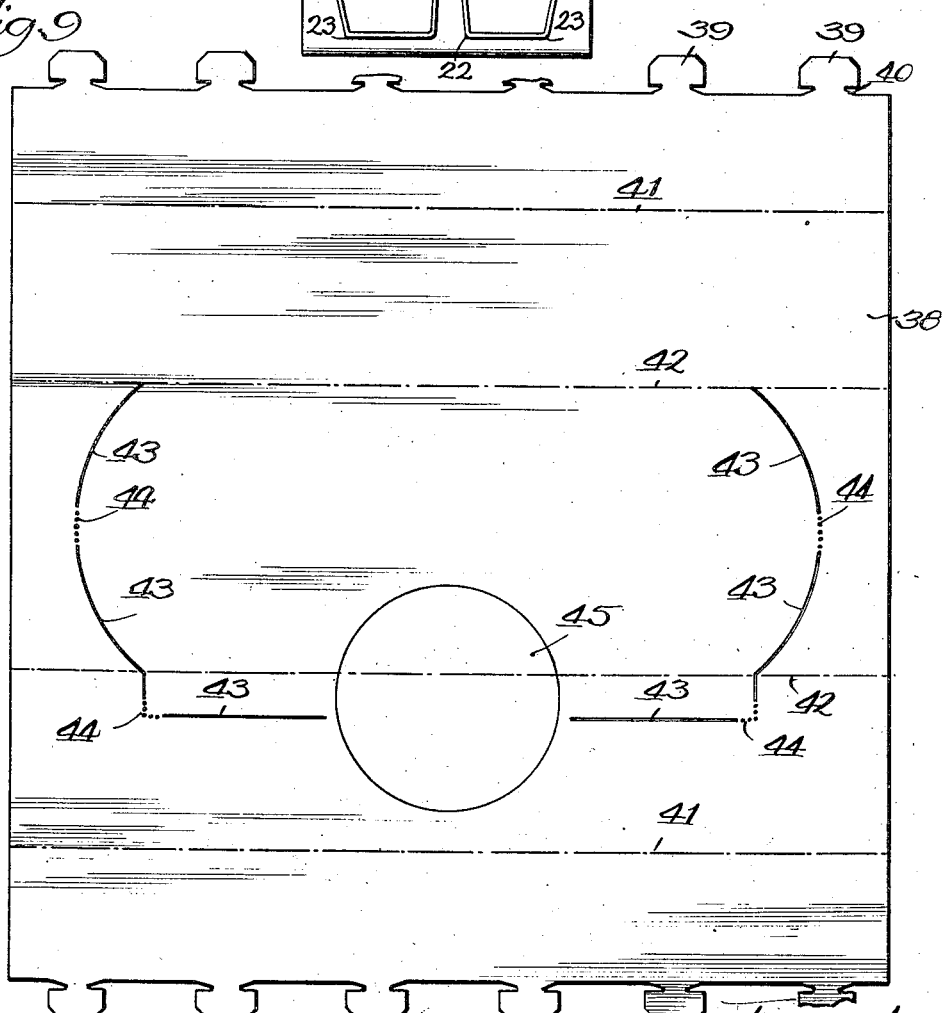

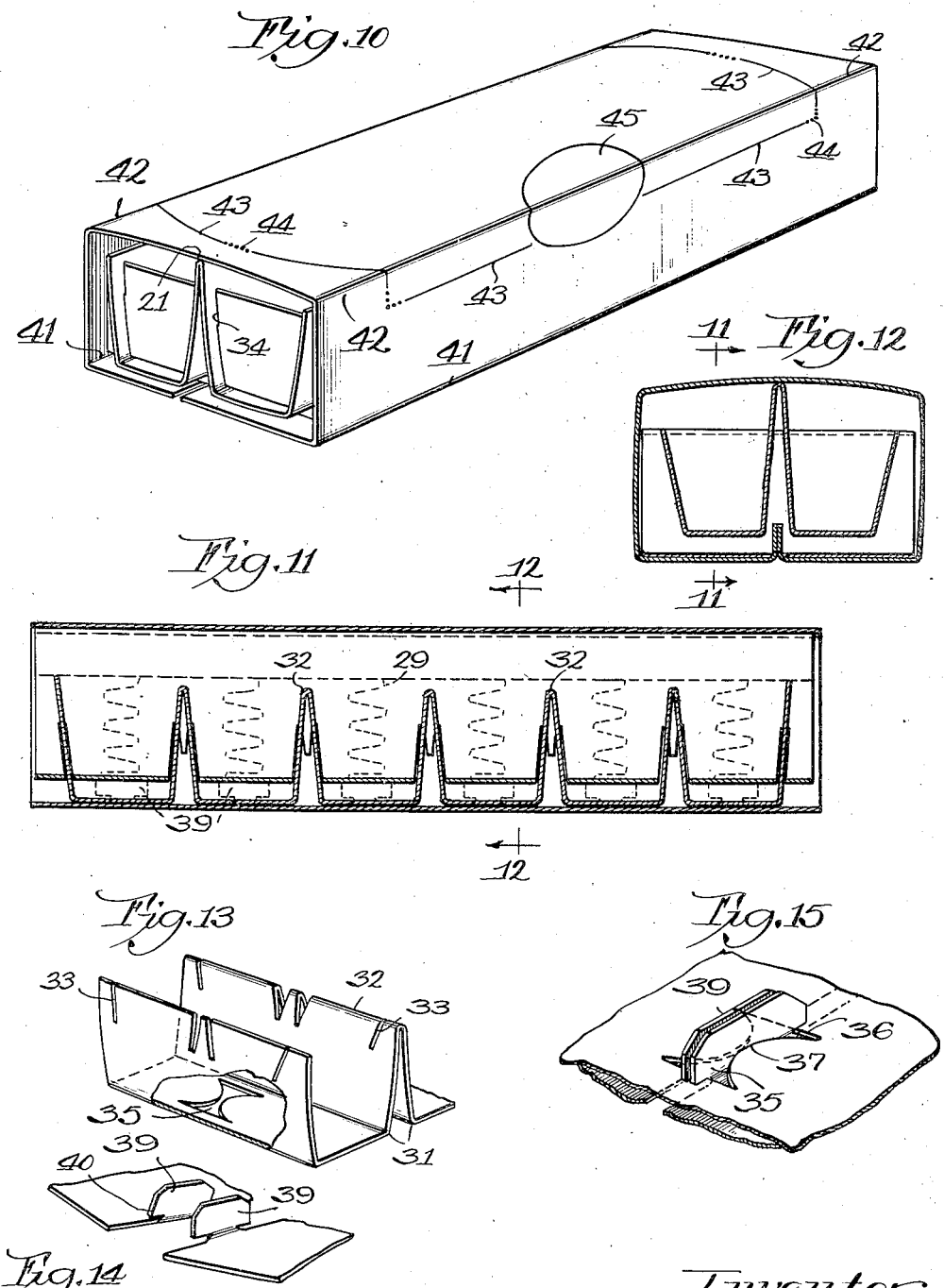

Patented May 23, 1933

1,910,408

UNITED STATES PATENT OFFICE

LOUIS SCHWARTZBERG, OF CHICAGO, ILLINOIS

CELL STRUCTURE AND INCLOSING ELEMENT

Application filed July 3, 1930. Serial No. 465,482.

My present invention has relation to the provision of a cell structure, together with an inclosing element therefor, suitable for the packing, handling and marketing of eggs or like fragile articles.

I have had as a combined object in the development of this structure the securing of a structure which will be strong and dependable and which at the same time will comprise few and simple elements that can be made and assembled quickly and with a minimum of expense.

As will hereafter be seen, the cells of my structure comprise only two elements, a longitudinal element blanked out of an integral piece of paper, or other suitable material, and a transverse element, also blanked out of a single integral piece of paper, which, when assembled with the longitudinal element provides a double bottom for the cell structure division walls between the cells and sturdy transverse reinforcements for the structure as a whole.

While my improved cell structure may be employed to advantage with any suitable carton of requisite dimensions, I have provided therewith an inclosing element, formed also from an integral piece of material which assembles and interlocks with the cell structure. Also in connection with the inclosing element I have provided a partially detached portion which may be readily torn to afford access to the cells so that the contents of the package cannot be reached or tampered with without disclosing that the inclosing element has been broken.

I attain the foregoing objects and results by means of the divers structural elements and the manner of their assembly illustrated in the accompanying drawings, in which—

Fig. 1 is a plan or development of the blank cut and ready to be folded to form the longitudinal cell member.

Fig. 2 is a side elevation of the blank shown in Fig. 1 after the same has been folded into the form it assumes in the completed cell structure.

Fig. 3 is an end elevation of the form folded, as in Fig. 2.

Fig. 7 is a side elevation of the longitudinal and transverse cell members after they have been assembled to constitute the cell structure.

Fig. 8 is an end elevation of the structure shown in Fig. 7.

Fig. 9 is a blank or development of the inclosing member.

Fig. 10 is a perspective of the inclosing member assembled with the cell structure.

Fig. 11 is a transverse section of the structure shown in Fig. 10 on the section line 11—11 of Fig. 12.

Fig. 12 is a transverse section on the line 12—12 of Fig. 11.

Fig. 13 is a fragmental perspective of the transverse cell member, a portion thereof being broken away to illustrate the location and form of a locking slot for receiving the tongues or tangs of the inclosing member.

Fig. 14 is a fragmental perspective detail of the tangs of the inclosing member; and Fig. 15 is a fragmental detail showing the tangs of the inclosing member after the same have been inserted into the slot of the transverse cell member.

Similar reference characters refer to similar parts throughout the respective views.

Figure 4:
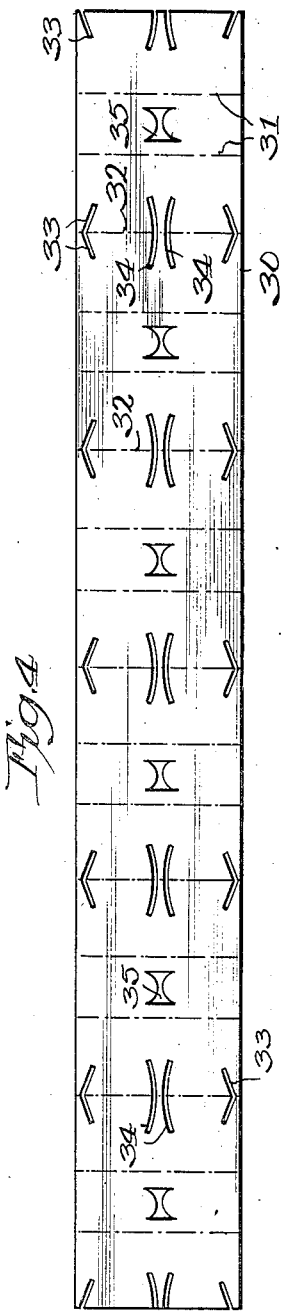
Fig. 4 is a plan or development of the blank cut and ready for folding to constitute the transverse cell member.

The longitudinal cell member consists of a rectangular blank 20 which is creased or scored at 21 along its longitudinal center to fold as shown in Fig. 3. At equal distances from the longitudinal center it is creased or scored in lines parallel with the center at 22 and 23 to fold, as also shown in Fig. 3. Transversely of the score or crease lines 22 and 23 are provided the slightly curved end slots 24. Between the end slots and equally spaced from the end slots and each other are the intermediate slots 25. The end slots 24 are considerably narrower than the intermediate slots 25 as the end slots, as will hereafter be seen, receive but one thickness of the transverse cell member while the intermediate slots receive the slightly diverging walls or thicknesses of a fold of the transverse cell members. At the end of each intermediate slot may be provided a tongue 26 for entering between the diverging walls of the folds of the transverse cell member and the presence of these tongues increase the rigidity of the assembled structure although their presence is not necessary to the provision of a strong and practical cell. Centrally of each slot 24 and 25, which, when folded constitutes the bottom of a cell, the slots are enlarged, as at 27, to provide ventilation, which is highly desirable when the cells are filled with eggs. Also, to increase the ventilation supplied by the enlargements 27, I provide centrally of the bottoms of each cell a cut-out 28, which I have shown in cross form but which may take any desired form.

Between the scored or creased lines 23 and the longitudinal edges of the blank 20 and centrally with relation to the slots 24 and 25 are undulated or serrated cuts 29, which permit the outer longitudinal walls of the cells to give for the insertion of an egg or other object so as to maintain the egg vertically by means of a yielding pressure upon its sides.

It is common knowledge that an egg has much greater stability in the direction of its longer axis.

The blank 30, as shown in Fig. 4, is provided transversely with scored or creased folding lines 31 and 32, the lines 31 being arranged in pairs and the lines 32 being placed between pairs of the lines 31, each end of the blank 30 acting in a manner comparable with the portion of the blank occupied by the creased lines 32. Slightly angling towards the center of the blank from each end and from each transverse fold line 32 are edge slots 33, which, when the longitudinal and transverse cell members are assembled, receive the portions of the longitudinal cell member between the slots 24 and 25 and the longitudinal edges of the blank.

Centrally of each end and fold mark 32 of the blank 30 are a pair of diverging slots 34 which receive a portion of the longitudinal cell member lying between the ends of the slots 24 and 25 and the central crease line 21.

It will be seen by reference to Figs. 2, 3, 7 and 8 that sufficient space is provided between the ends of the slots 24 and 25 and the crease line 21 to bring the central longitudinal cell partitions well above the outside and transverse cell walls. Such an elevated central longitudinal cell wall arrangement stiffens the entire structure, permits the cell structure to be handled readily both when empty and when filled with eggs, and also supports weight which would otherwise rest upon the eggs when a number of packages are piled one upon another. The material between the slots 34 enters between the inclined walls of the central partition, as shown in Fig. 8, and serves to further strengthen the central longitudinal partition of the cell structure.

Centrally of the blank 30 and between each pair of the crease lines 31 are provided apertures 35 for receiving the tangs on the inclosing member, as hereafter described. The apertures 35 have straight end edges 36 and inwardly bowed side edges 37, as is most clearly seen in Fig. 15.

Figure 5:
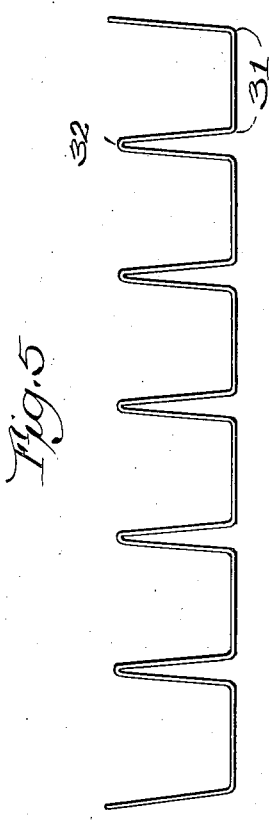
Fig. 5 is a side elevation of the blank shown in Fig. 4 after it has been folded into the form it assumes in the cell structure.
Figure 6:
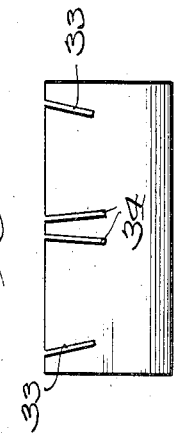
Fig. 6 is an end elevation of the structure shown in Fig. 5.

To assemble the cell structure the longitudinal blank 20, folded as shown in Figs. 2 and 3, is brought down upon blank 30, folded as shown in Figs. 5 and 6, so that the upper portions of the longitudinal walls seat in the slots 33 and 34 and the lower portions of the vertical walls of blank 30 seat in the slots 24 and 25 of the longitudinal member 20. The assembly of the longitudinal and transverse cell members is most clearly shown in Figs. 7 and 8.

As previously indicated the cell structure, above described, may be used advantageously with any suitable size and form of carton or crate, but to inclose it in the simplest and most inexpensive manner I have provided the inclosing member, a development of which is shown in Fig. 9. The blank 38 of the inclosing member is rectangular in shape and is provided on each longitudinal edge with aligning tongues or tangs 39, which are undercut as at 40. The development or blank 38 is provided with scored or creased fold lines 41—41 next the longitudinal edges and 42—42 intermediate the fold lines 41. The space between the fold lines 42—42 comprises the top which goes over the cell structure. The space between the fold lines 41—42 comprises the longitudinal sides of the completed structure and the space between the fold lines 41 and the longitudinal edges of the blank comprises each a half of the bottom of the structure.

After the cell structure has been filled the inclosing member is placed around it, as shown in Figs. 10 and 12, and each pair of tangs 39 is thrust through the recesses 35, the inwardly curved side edges of the aperture, permitting the tangs to slant somewhat in order to enter, but after the tangs 39 have entered the apertures 35, the inwardly curved side edges of the apertures hold them in locked position, as shown most clearly in Fig. 15, so that it is practically impossible to withdraw the tangs 39 from the apertures 35 without tearing them.

To permit access to the cells without tearing off the inclosing member I partially cut a door or window therein by means of the interrupted slits 43, the parts between the interruptions in the slits 43 being perforated, as at 44, to facilitate tearing. Opposite to the uncut edge which forms the back of the door or window I prefer to provide an extended gap between the interrupted slits 43 which will have to be torn across to open the door or window. Across this extended interval between the slits 43 may be attached or printed a seal 45 with suitable instructions for opening thereon. The provision of this door or window will permit the use of the structure until its contents are used up, and at the same time will show by the torn seal that it has been opened.

Having described my invention what I claim as new and desire to secure by Letters Patent is:—

1. A cell structure of two parallel rows of cells comprising a longitudinal cell member folded longitudinally to provide an inverted V-shaped central wall of substantially the height of the articles to be received in the cells, horizontal bottom walls and upstanding side walls of a height to permit the grasping of the articles contained in the cells, the bottom and adjacent portions of the side walls being transversely slotted and a transverse cell member being transversely folded to provide horizontal bottom walls, end walls and inverted V-shaped intermediate walls, the tops of said intermediate walls being slotted and said elements being assembled so that the unslotted portions of said respective members assemble with the slots in the opposite members.

2. A cell structure of two parallel rows of cells comprising a longitudinal cell member folded longitudinally to provide an upstanding central wall of substantially the height of the articles to be received in the cells, horizontal bottom walls and upstanding side walls of a height to permit of the grasping of the article contained in the cells, the bottom and adjacent partitions of the side walls including the central wall being transversely slotted and a transverse cell member being transversely folded to provide horizontal bottom walls, end walls and double intermediate walls, the tops of said intermediate and end walls being slotted and said elements being assembled so that the unslotted portions of said respective members assemble with the slots in the opposite members.

3. A plurality of cell structures each comprising a longitudinal cell member folded longitudinally to provide an upstanding central wall of substantially the height of the articles to be received in the cells, horizontal bottom walls and upstanding side walls of a height to permit of the grasping of the article contained in the cells, the bottom and adjacent partitions of the side walls including the central wall being transversely slotted and a transverse cell member being transversely folded to provide horizontal bottom walls, end walls and double intermediate walls, the tops of said intermediate and end walls being slotted and said elements being assembled so that the unslotted portions of said respective members assemble with the slots in the opposite members whereby parallel rows of said cell structures support superposed cell structures disposed at right angles with the supporting structures.

LOUIS SCHWARTZBERG.